(12) United States Patent
Nishitani et al.

(10) Patent No.: US 7,466,048 B2
(45) Date of Patent: Dec. 16, 2008

(54) DYNAMOELECTRIC STATOR

(75) Inventors: Shoichiro Nishitani, Tokyo (JP);
Wakaki Miyaji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 516 days.

(21) Appl. No.: 11/353,051

(22) Filed: Feb. 14, 2006

(65) Prior Publication Data
US 2007/0057590 A1 Mar. 15, 2007

(30) Foreign Application Priority Data
Sep. 12, 2005 (JP) ............................. 2005-263727

(51) Int. Cl.
*H02K 17/00* (2006.01)
(52) U.S. Cl. ......................................... 310/71; 310/201
(58) Field of Classification Search .................... 310/71, 310/201, 179, 180
See application file for complete search history.

(56) References Cited
U.S. PATENT DOCUMENTS
5,828,147 A * 10/1998 Best et al. ..................... 310/71
6,791,228 B2 * 9/2004 Hashiba et al. ............. 310/201
2003/0218394 A1 * 11/2003 Hashiba et al. ............... 310/71

FOREIGN PATENT DOCUMENTS
| JP | 2001-103697 A | 4/2001 |
| JP | 2003-348780 A | 12/2003 |
| JP | 2004-023916 A | 1/2004 |

* cited by examiner

*Primary Examiner*—Gary F. Paumen
(74) *Attorney, Agent, or Firm*—Sughrue Mion, PLLC

(57) ABSTRACT

First and second lead portions of an a-phase winding, a b-phase winding and a c-phase winding are each led out from a rear-end coil end group, and subsequently led around circumferentially along an apex portion of the rear-end coil end group so as to be separated from the apex portion. In addition, the first lead portions and the second lead portions are bent axially so as to contact each other closely and are joined together. The first lead portions are fastened by ties in a vicinity of the bent portion extending to the joined portion of the first lead portion, and the second lead portions are fastened by ties in a vicinity of a portion at which the first lead portion is led out from the rear-end coil end group.

3 Claims, 4 Drawing Sheets

DYNAMOELECTRIC STATOR

BACKGROUND OF THE INVENTION

1. Field of the Invention

The present invention relates to a dynamoelectric stator for an automotive alternator, etc., and particularly relates to a fixing construction for a lead portion led out from a coil end group of a stator winding.

2. Description of the Related Art

In conventional dynamoelectric stators, lead portions constituting a portion of a plurality of phase windings are laid circumferentially along surface of a coil end group and fixed to the coil end group using an adhesive (See Patent Literature 1, for example). In addition, in order to increase bond strength between the lead portions and the coil end group, restricting recess portions corresponding to a lead portion shape may be disposed on apex portions of the coil end group and the lead portions positioned inside the restricting recess portions and fixed using an adhesive (See Patent Literature 2, for example).

Patent Literature 1: Japanese Patent Laid-Open No. 2001-103697 (Gazette)

Patent Literature 2: Japanese Patent Laid-Open No. 2004-23916 (Gazette)

In conventional dynamoelectric stators according to Patent Literature 1, because the bond strength between the lead portions and the coil end group is affected by layout of the lead portions relative to the coil end group, it has been difficult to achieve stable bond strength between the two. Thus, there is a risk that the lead portions may be dislodged from the coil end group due to vibrations from an engine when a vehicle mounted with a dynamoelectric machine is driven. Thus, because lead portions that have dislodged from the coil end group shake and move around, giving rise to wire breakages in the lead portions, and also rub against the coil end group, giving rise to damage to the coil end group, one problem has been that reliability of the dynamoelectric machine is reduced.

In conventional dynamoelectric stators according to Patent Literature 2, because it is necessary to dispose the restricting recess portions so as to correspond to each of the lead portions, making the configuration of the coil end complicated, one problem has been that forming the coil end is troublesome and expensive. Because the lead portions are housed inside the restricting recess portions and additionally embedded in the adhesive, area of the lead portions and the coil end group exposed to cooling airflows is reduced, and there is a risk that this may have adverse thermal effects.

SUMMARY OF THE INVENTION

The present invention aims to solve the above problems and an object of the present invention is to provide a dynamoelectric stator enabling vibration resistance of lead portions to be increased and reductions in area of the lead portions and coil end group exposed to cooling airflows to be suppressed without increasing work or cost.

In order to achieve the above object, according to one aspect of the present invention, there is provided a dynamoelectric stator including: a cylindrical stator core in which a large number of slots are arranged at a predetermined pitch circumferentially so as to be open on an inner peripheral side; and a stator winding having a plurality of phase windings installed inside the slots, the plurality of phase windings forming first and second coil end groups at first and second axial end portions of the stator core. Phase winding lead portions are each led out from the first coil end group so as to constitute a led out portion, subsequently led around circumferentially along an apex portion of the first coil end group so as to be separated from the apex portion, and joined to a respective joined phase winding lead portion to constitute the stator winding. At least one of the phase winding lead portions constitutes a fastened lead portion fixed to an unjoined phase winding lead portion lying parallel circumferentially along the apex portion of the first coil end group by fastening using a fastening member.

According to the present invention, because the unjoined phase winding lead portions are fastened to each other using the fastening member, it is not necessary to form restricting recess portions for restricting the position of the lead portions on the first coil end, enabling vibration resistance of the lead portions to be improved without increasing work or cost.

Because the lead portions are led around circumferentially along the apex portion of the coil end group so as to be separated from the apex portion, clearance is ensured between the lead portions and the first coil end group. Thus, reductions in area of the lead portions and the first coil end group exposed to cooling airflows are suppressed, suppressing excessive stator winding temperature increases.

In addition, because the lead portions are led around along the apex portion of the first coil end group, the lead portions can be disposed without increasing radial dimensions of the stator which constitutes a factor in increasing body size of dynamoelectric machines.

DETAILED DESCRIPTION OF THE PREFERRED EMBODIMENT

A preferred embodiment of the present invention will now be explained with reference to the drawings.

Figure 1:
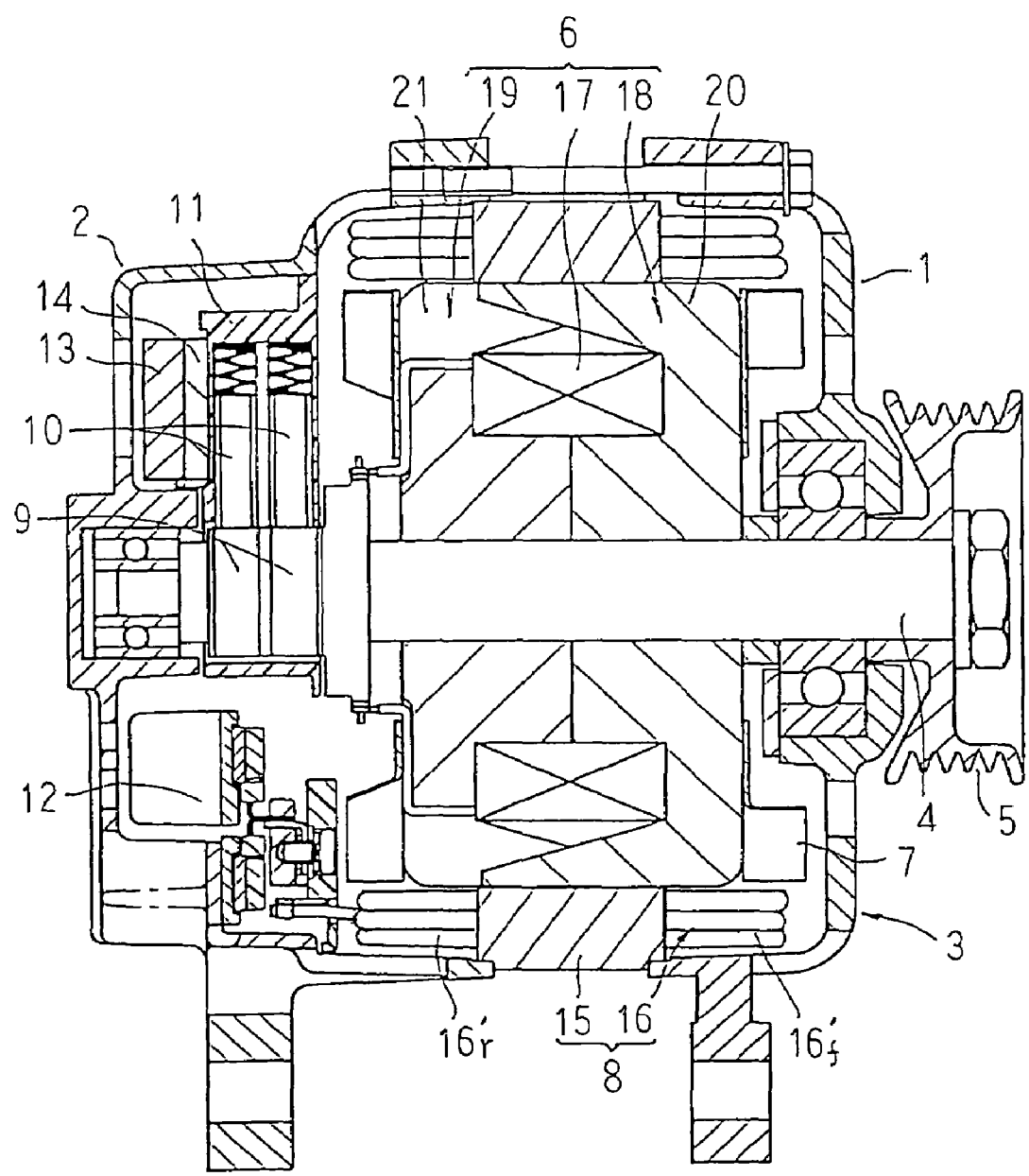
FIG. 1 is a longitudinal section showing a dynamoelectric machine mounted with a stator according to a preferred embodiment of the present invention.
Figure 2:
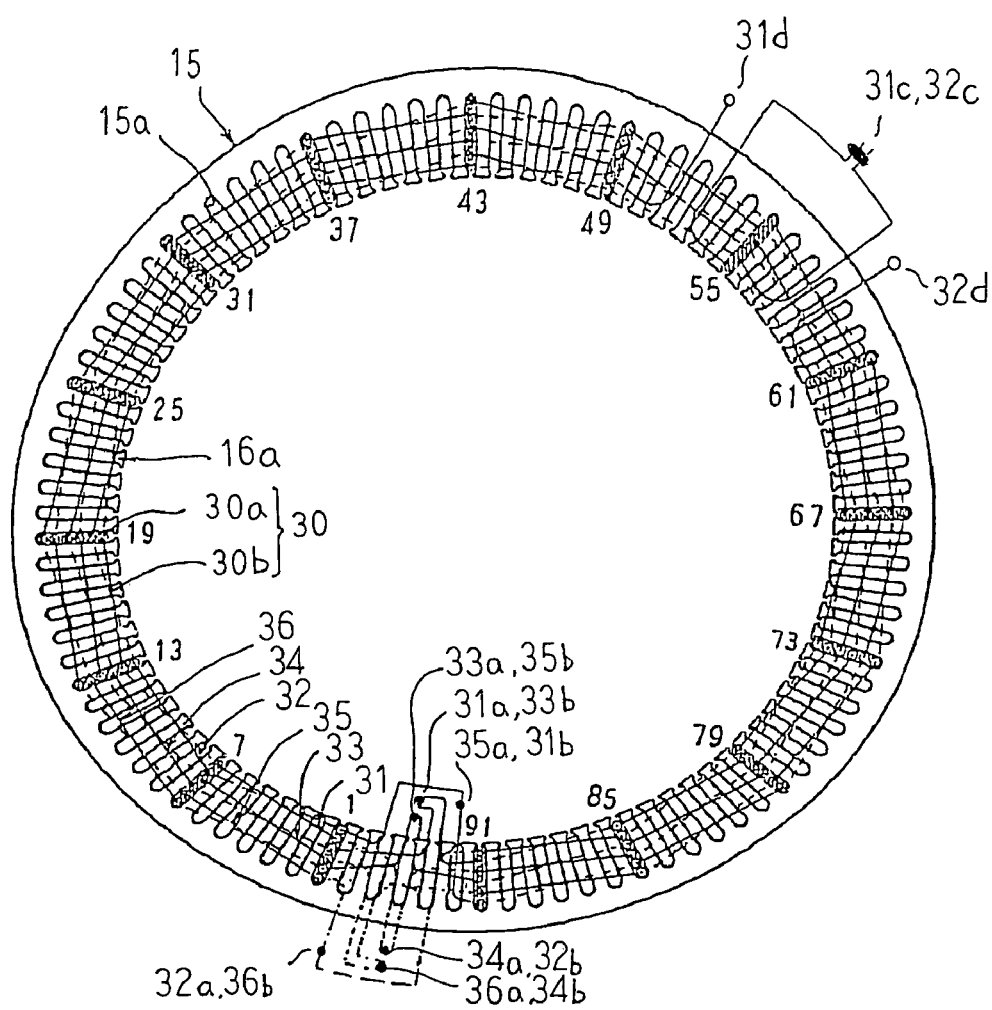
FIG. 2 is a rear-end end elevation of a stator core explaining a configuration of a stator winding in the stator according to the preferred embodiment of the present invention.
Figure 3:
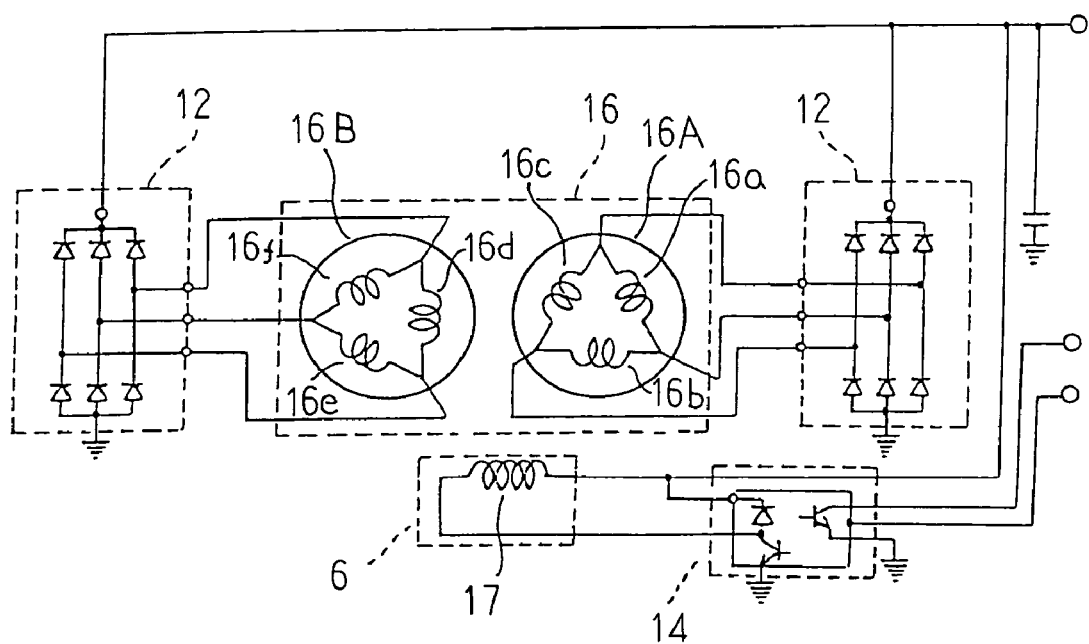
FIG. 3 is a circuit diagram for the dynamoelectric machine mounted with the stator according to the preferred embodiment of the present invention.
Figure 4:
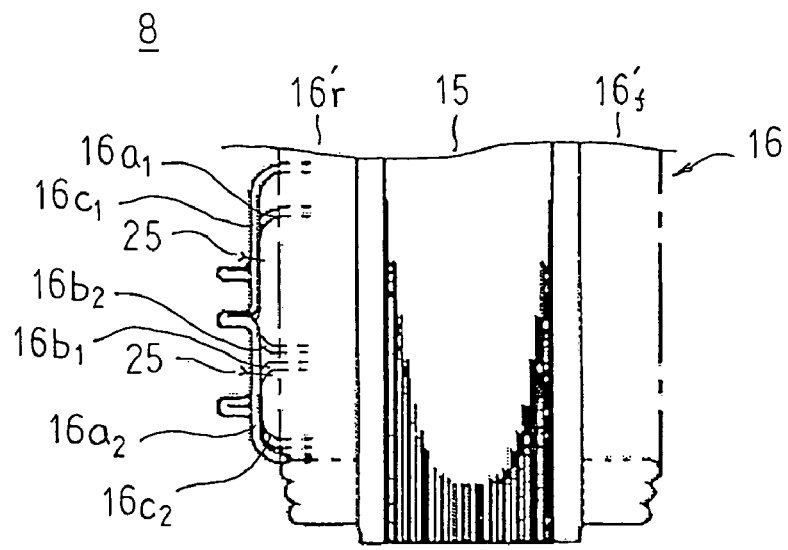
FIG. 4 is a side elevation showing part of the stator according to the preferred embodiment of the present invention.
Figure 5:
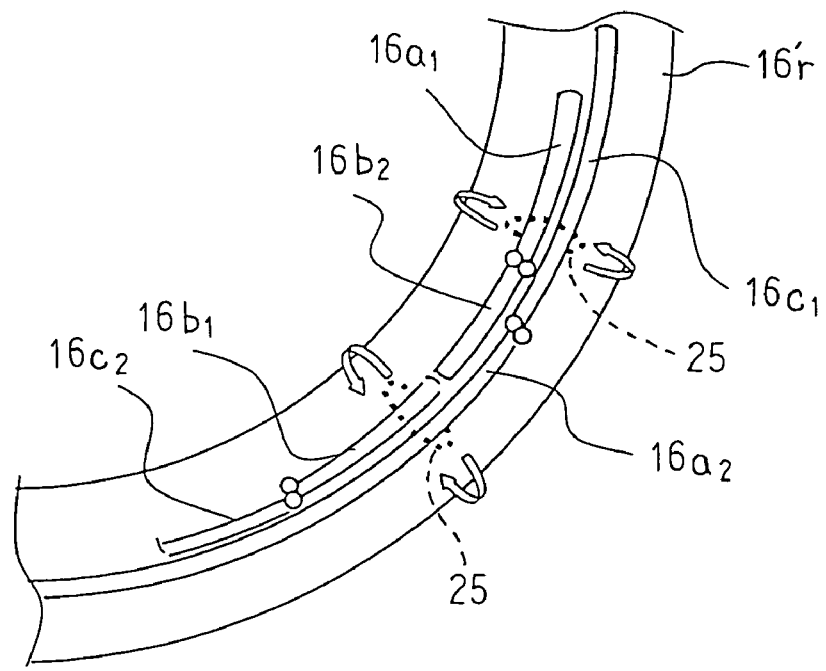
FIG. 5 is a view from a rear end of part of the stator according to the preferred embodiment of the present invention.

FIG. 1 is a longitudinal section showing a dynamoelectric machine mounted with a stator according to a preferred embodiment of the present invention, FIG. 2 is a rear-end end elevation of a stator core explaining a configuration of a stator winding in the stator according to the preferred embodiment of the present invention, FIG. 3 is a circuit diagram for the dynamoelectric machine mounted with the stator according to the preferred embodiment of the present invention, FIG. 4 is a side elevation showing part of the stator according to the preferred embodiment of the present invention, and FIG. 5 is a view from a rear end of part of the stator according to the preferred embodiment of the present invention.

In FIG. 1, a dynamoelectric machine includes: a case 3 constituted by a front bracket 1 and a rear bracket 2 made of aluminum that are each generally bowl-shaped; a shaft 4 rotatably supported by the case 3; a pulley 5 fixed to an end portion of the shaft 4 projecting outward at a front end of the case 3; a rotor 6 fixed to the shaft 4 and accommodated inside the case 3; fans 7 fixed to first and second axial end surfaces of the rotor 6; a stator 8 fixed to an inner wall surface of the case 3 so as to surround an outer periphery of the rotor 6; slip rings 9 fixed to a rear end of the shaft 4 so as to supply electric current to the rotor 6; a pair of brushes 10 disposed inside the case 3 so as to slide on the slip rings 9; a brush holder 11 for housing the brushes 10; rectifiers 12 electrically connected to the stator 8 so as to convert alternating current generated in the stator 8 into direct current; a heat sink 13 mounted to the brush holder 11; and a regulator 14 bonded to the heat sink 13, the regulator 14 adjusting magnitude of alternating voltage generated in the stator 8.

The rotor 6 includes: a field winding 17 for generating magnetic flux on passage of electric current; and a pair of first and second pole cores 18 and 19 disposed so as to cover the field winding 17, magnetic poles being formed in the first and second pole cores 18 and 19 by the magnetic flux from the field winding 17. The first and second pole cores 18 and 19 are made of iron and have eight first and eight second claw-shaped magnetic poles 20 and 21, respectively, each of the claw-shaped magnetic poles 20 and 21 having a generally trapezoidal radially-outermost surface shape disposed on an outer peripheral edge portion at a uniform angular pitch in a circumferential direction so as to project axially, and the first and second pole cores 18 and 19 are fixed to the shaft 4 facing each other such that the first and second claw-shaped magnetic poles 20 and 21 intermesh.

The stator 8 is constituted by: a cylindrical stator core 15 constituted by a laminated body of magnetic steel plates; and a stator winding 16 installed in the stator core 15. Ninety-six (for example) slots 15a opening radially inward are formed in the stator core 15 at a uniform angular pitch circumferentially, as shown in FIG. 2. In other words, the slots 15a are formed at a ratio of two slots per phase per pole. An insulator (not shown) is mounted inside each of the slots 15a so as to ensure electrical insulation between the stator core 15 and the stator winding 16.

Next, construction of the stator winding 16 will be explained.

First, construction of a first single phase winding constituting the stator winding 16 will be explained with reference to FIG. 2. Here, housing positions for conductor wires 30 inside the slots 15a will be designated Address 1, Address 2, Address 3, Address 4, Address 5, and Address 6, respectively, from radially inside to facilitate explanation. Furthermore, in FIG. 2, solid lines indicate connections at a rear end of the stator core 15, broken lines indicate connections at a front end of the stator core 15, black circles indicate joined portions, and 1, 7, 13, etc., through 91 represent slot numbers.

An a-phase winding 16a is constituted by first through sixth winding sub-portions 31 through 36 each formed by one conductor wire 30 functioning as a wire composed of a continuous copper wire having a rectangular cross section coated with an insulator.

The conductor wires 30 are constituted by: straight slot-housed portions 30a arranged at a pitch of six slots; and return portions 30b alternately linking end portions of adjacent slot-housed portions 30a with each other at the front end and the rear end. The conductor wires 30 are installed in the stator core 15 as wave windings by housing the slot-housed portions 30a in every sixth slot 15a.

The first winding sub-portion 31 is configured by wave winding one conductor wire 30 so as to alternately occupy Address 2 and Address 1 in every sixth slot 15a from Slot Numbers 1 through 91. The second winding sub-portion 32 is configured by wave winding one conductor wire 30 so as to alternately occupy Address 1 and Address 2 in every sixth slot 15a from Slot Numbers 1 through 91. The third winding sub-portion 33 is configured by wave winding one conductor wire 30 so as to alternately occupy Address 4 and Address 3 in every sixth slot 15a from Slot Numbers 1 through 91. The fourth winding sub-portion 34 is configured by wave winding one conductor wire 30 so as to alternately occupy Address 3 and Address 4 in every sixth slot 15a from Slot Numbers 1 through 91. The fifth winding sub-portion 35 is configured by wave winding one conductor wire 30 so as to alternately occupy Address 6 and Address 5 in every sixth slot 15a from Slot Numbers 1 through 91. The sixth winding sub-portion 36 is configured by wave winding one conductor wire 30 so as to alternately occupy Address 5 and Address 6 in every sixth slot 15a from Slot Numbers 1 through 91. In each of the slots 15a, six slot-housed portions 30a of the conductor wires 30 are arranged so as to line up in one column radially with longitudinal axes of their rectangular cross sections aligned radially so as to be surrounded by an insulator.

At the rear end of the stator core 15, a first end portion 31a of the first winding sub-portion 31 projecting outward from Slot Number 91 of the slots 15a and a second end portion 33b of the third winding sub-portion 33 projecting outward from Slot Number 1 of the slots 15a are joined together using tungsten-arc inert gas-shielded (TIG) welding, a first end portion 33a of the third winding sub-portion 33 projecting outward from Slot Number 91 of the slots 15a and a second end portion 35b of the fifth winding sub-portion 35 projecting outward from Slot Number 1 of the slots 15a are joined together using TIG welding, and a first end portion 35a of the fifth winding sub-portion 35 projecting outward from Slot Number 91 of the slots 15a and a second end portion 31b of the first winding sub-portion 31 projecting outward from Slot Number 1 of the slots 15a are joined together using TIG welding. Thus, the first winding sub-portion 31, the third winding sub-portion 33, and the fifth winding sub-portion 35 are connected in series to form a three-turn wave winding.

At the front end of the stator core 15, a first end portion 34a of the fourth winding sub-portion 34 projecting outward from Slot Number 91 of the slots 15a and a second end portion 32b of the second winding sub-portion 32 projecting outward from Slot Number 1 of the slots 15a are joined together using TIG welding, a first end portion 36a of the sixth winding sub-portion 36 projecting outward from Slot Number 91 of the slots 15a and a second end portion 34b of the fourth winding sub-portion 34 projecting outward from Slot Number 1 of the slots 15a are joined together using TIG welding, and a first end portion 32a of the second winding sub-portion 32 projecting outward from Slot Number 91 of the slots 15a and a second end portion 36b of the sixth winding sub-portion 36 projecting outward from Slot Number 1 of the slots 15a are joined together using TIG welding. Thus, the second winding sub-portion 32, the fourth winding sub-portion 34, and the sixth winding sub-portion 36 are connected in series to form a three-turn wave winding.

Next, a portion of the conductor wire 30 of the first winding sub-portion 31 projecting outward at the rear end from Slot Number 49 and Slot Number 55 of the slots 15a is cut, and a portion of the conductor wire 30 of the second winding sub-portion 32 projecting outward from Slot Number 55 and Slot Number 61 of the slots 15a is cut. Then, a first cut end 31c of the first winding sub-portion 31 projecting outward from Address 1 of Slot Number 55 of the slots 15a, and a first cut end 32c of the second winding sub-portion 32 projecting outward from Address 2 of Slot Number 55 of the slots 15a are joined together by TIG welding. Thus, a six-turn wave winding (the a-phase winding 16a) is formed in which the first through sixth winding sub-portions 31 through 36 are connected in series. A second cut end 31d of the first winding sub-portion 31 projecting outward from Address 2 of Slot Number 49 of the slots 15a and a second cut end 32d of the second winding sub-portion 32 projecting outward from Address 1 of Slot Number 61 of the slots 15a become first and second end portions, in other words lead portions, of the a-phase winding 16a.

Although not shown, a d-phase winding 16d, a c-phase winding 16c, an f-phase winding 16f, a b-phase winding 16b, and an e-phase winding 16e are formed in a similar manner such that the slot groups into which the conductor wires 30 of each phase winding are installed are successively offset by one slot from each other. The a-phase winding 16a is installed in a first slot group including Slot Numbers 1, 7, etc., through 91, the d-phase winding 16d is installed in a second slot group including Slot Numbers 2, 8, etc., through 92, the c-phase winding 16c is installed in a third slot group including Slot Numbers 3, 9, etc., through 93, the f-phase winding 16f is installed in a fourth slot group including Slot Numbers 4, 10, etc., through 94, the b-phase winding 16b is installed in a fifth slot group including Slot Numbers 5, 11, etc., through 95, and the e-phase winding 16e is installed in a sixth slot group including Slot Numbers 6, 12, etc., through 96.

Next, end portions of the a-phase winding 16a, the b-phase winding 16b, and the c-phase winding 16c are connected to each other (delta connected) to constitute a first three-phase alternating-current winding 16A. End portions of the d-phase winding 16d, the e-phase winding 16e, and the f-phase winding 16f are connected to each other (delta connected) to constitute a second three-phase alternating-current winding 16B. Thus, as shown in FIG. 3, a stator winding 16 is configured that is constituted by the two three-phase alternating-current windings 16A and 16B. Connection portions among the end portions of each of the phase windings of the first and second three-phase alternating-current windings 16A and 16B are electrically connected to the rectifiers 12 such that alternating voltages from the two three-phase alternating-current windings 16A and 16B are respectively converted into direct current by the rectifiers 12 and output.

In a front-end end portion of a stator 8 configured in this manner, the return portions 30b are arranged so as to line up in three rows radially at a pitch of one slot circumferentially and constitute a front-end coil end group 16'f. Similarly, in a rear-end end portion, the return portions 30b are arranged so as to line up in three rows radially at a pitch of one slot circumferentially to constitute a rear-end coil end group 16'r.

A method for delta connecting the end portions of the a-phase winding 16a, the b-phase winding 16b and the c-phase winding 16c to each other will now be explained with reference to FIGS. 4 and 5.

First, a first lead portion $16a_1$ of the a-phase winding 16a is led out axially from the rear-end coil end group 16'r, is then bent in a first circumferential direction, and is led around in the first circumferential direction along an apex portion of the rear-end coil end group 16'r so as to be separated from the apex portion. A second lead portion $16b_2$ of the b-phase winding 16b is led out axially from the rear-end coil end group 16'r, is then bent in a second circumferential direction, and is led around in the second circumferential direction along an apex portion of the rear-end coil end group 16'r so as to be separated from the apex portion. Then, end portions of the first lead portion $16a_1$ of the a-phase winding 16a and the second lead portion $16b_2$ of the b-phase winding 16b are bent axially so as to contact each other closely and joined together with each other by TIG welding. Moreover, the first lead portion $16a_1$ of the a-phase winding 16a and the second lead portion $16b_2$ of the b-phase winding 16b constitute joined phase winding lead portions.

A first lead portion $16b_1$ of the b-phase winding 16b is led out axially from the rear-end coil end group 16'r, is then bent in the first circumferential direction, and is led around in the first circumferential direction along an apex portion of the rear-end coil end group 16'r so as to be separated from the apex portion. A second lead portion $16c_2$ of the c-phase winding 16c is led out axially from the rear-end coil end group 16'r, is then bent in the second circumferential direction, and is led around in the second circumferential direction along an apex portion of the rear-end coil end group 16'r so as to be separated from the apex portion. Then, end portions of the first lead portion $16b_1$ of the b-phase winding 16b and the second lead portion $16c_2$ of the c-phase winding 16c are bent axially so as to contact each other closely and joined together with each other by TIG welding. Moreover, the first lead portion $16b_1$ of the b-phase winding 16b and the second lead portion $16c_2$ of the c-phase winding 16c constitute joined phase winding lead portions.

In addition, a first lead portion $16c_1$ of the c-phase winding 16c is led out axially from the rear-end coil end group 16'r, is then bent in the first circumferential direction, and is led around in the first circumferential direction along an apex portion of the rear-end coil end group 16'r parallel to a led around portion of the first lead portion $16a_1$ of the a-phase winding 16a so as to be separated from the apex portion. A second lead portion $16a_2$ of the a-phase winding 16a is led out axially from the rear-end coil end group 16'r, is then bent in the second circumferential direction, and is led around in the second circumferential direction along an apex portion of the rear-end coil end group 16'r parallel to led around portions of the first lead portion $16b_1$ of the b-phase winding 16b and the second lead portion $16c_2$ of the c-phase winding 16c so as to be separated from the apex portion. Then, end portions of the first lead portion $16c_1$ of the c-phase winding 16c and the second lead portion $16a_2$ of the a-phase winding 16a are bent axially so as to contact each other closely and joined together with each other by TIG welding. Moreover, the first lead portion $16c_1$ of the c-phase winding 16c and the second lead portion $16a_2$ of the a-phase winding 16a constitute joined phase winding lead portions.

Next, the first lead portion $16c_1$ of the c-phase winding is fastened to the first lead portion $16a_1$ of the a-phase winding 16a in a vicinity of the joined portion with the second lead portion $16b_2$ of the b-phase winding 16b using a tie 25 functioning as a fastening member. The second lead portion $16a_2$ of the a-phase winding is fastened to the first lead portion $16b_1$ of the b-phase winding 16b in a vicinity of a portion led out from the rear-end coil end group 16'r using a tie 25. Here, the first lead portion $16c_1$ of the c-phase winding and the first lead portion $16a_1$ of the a-phase winding 16a constitute unjoined phase winding lead portions, i.e., they are not joined to each other. Similarly, the second lead portion $16a_2$ of the a-phase winding and the first lead portion $16b_1$ of the b-phase winding 16b also constitute unjoined phase winding lead portions.

Thus, the a-phase winding 16a, the b-phase winding 16b, and the c-phase winding 16c are delta connected to constitute the first three-phase alternating-current winding 16A.

Moreover, although not shown, lead portions of the d-phase winding 16d, the e-phase winding 16e, and the f-phase winding 16f constituting the second three-phase alternating-current windings 16B are also similarly led around circumferentially along, but separated from, the apex portions of the coil end groups 16r and connected. Unjoined phase winding lead portions are also similarly fastened to each other using ties 25.

Thus, in the present invention, because the lead portions of the six phase windings are led out from the rear-end coil end group, and subsequently led around circumferentially along the apex portions of the rear-end coil end group so as to be separated from the apex portions, gaps are ensured between the lead portions and the rear-end coil end group. Thus, reductions in area of the lead portions and the rear-end coil end group exposed to cooling airflows are suppressed, suppressing excessive stator winding temperature increases.

In vehicles, the direction of vibrations from the engine resulting from engine piston motion is mainly perpendicular to the axis of rotation of the alternator. Thus, during engine operation, large vibrations are applied radially to the dynamoelectric machine. However, in this stator, because the lead portions are positioned axially relative to the rear-end coil end group, large vibrations do not act on the lead portions during engine operation, thereby suppressing the occurrence of wire breakages, etc., in the lead portions.

Because the phase winding lead portions are fastened to the unjoined phase winding lead portions using ties, overall rigidity of the lead portions is increased. Thus, because vibration of the lead portions is suppressed, the occurrence of wire breakages in the lead portions and damage to the coil end groups resulting from rubbing with the lead portions, etc., is also suppressed.

Because the lead portions are fastened to each other using ties, the lead portions can be fixed to each other simply without damaging the rear-end coil end group. Because it is not necessary to form recess portions for restricting displacement of the lead portions on the coil end groups, the lead portions can be fixed to each other without increasing work or cost. In addition, because it is not necessary to use adhesive, production control and parts management adapted to various countries of manufacture, seasons, work environments, etc., are no longer necessary.

Because a first phase winding lead portion is fastened by a tie to a second lead portion that is led around parallel to the first phase winding lead portion, the lead portions that are fastened to each other are led around circumferentially at positions that are different from each other radially. Thus, the first fastened lead portion will not interfere with the joined portion of the second fastened lead portion.

Because the first fastened lead portion is fastened by a tie in the vicinity of a portion of a second fastened lead portion that is led out from the rear-end coil end group, overall rigidity of the fastened lead portions is increased, improving vibration resistance. Similarly, because the first fastened lead portion is also fastened by a tie to a second fastened lead portion in the vicinity of a bent portion extending to a joined portion, overall rigidity of the fastened lead portions is increased, improving vibration resistance.

Moreover, in the above embodiment, the lead portions are fastened to each other by a tie at one position, but the lead portions are not limited to being fastened to each other at one position and may be fastened at a plurality of positions, or three or more lead portions may also be fastened together by a tie.

In the above embodiment, the lead portions are fastened to each other using ties, but the fastening member is not limited to a tie provided that it is made of an insulating material.

In the above embodiment, a stator winding constituted by two three-phase alternating-current windings is explained as being configured by delta connecting the a-phase winding, the b-phase winding, and the c-phase winding, and also delta connecting the d-phase winding, the e-phase winding, and the f-phase winding, but a stator winding constituted by two three-phase alternating-current windings may also be configured by wye connecting the a-phase winding, the b-phase winding, and the c-phase winding, and also wye connecting the d-phase winding, the e-phase winding, and the f-phase winding. In addition, a stator winding constituted by a single three-phase alternating-current winding may also be configured by connecting the a-phase winding and the d-phase winding in series, connecting the c-phase winding and the f-phase winding in series, and connecting the b-phase winding and the e-phase winding in series, then wye connecting the three series-connected windings.

In the above embodiment, a stator core in which the number of slots per phase per pole is two is used, but the number of slots per phase per pole is not limited to two, and a stator core in which the number of slots per phase per pole is one may also be used, for example. In that case, the stator winding will be constituted by three phase windings.

In the above embodiment, a stator core in which slots are formed at a uniform angular pitch circumferentially is used. In other words, in the above embodiment, the slots are formed at a uniform angular pitch in which spacing between center lines of slot opening portions is $\alpha_o$ degrees. However, a stator core in which slots are formed at a nonuniform pitch in which the spacing between the center lines of the slot opening portions alternates between $\alpha_1$ degrees and $\alpha_2$ degrees (where $\alpha_2$ does not equal $\alpha_1$) may also be used.

In the above embodiment, a stator winding is produced using conductor wires constituted by continuous wires, but a stator winding may also be produced using U-shaped conductor segments.

In the above embodiment, conductor wires having a rectangular cross section are used, but the conductor wires are not limited to having a rectangular cross-sectional shape, and may also have a circular cross section, for example.

In the above embodiment, the first through sixth winding sub-portions are connected based on the connection method shown in FIG. 2, but the first through sixth winding sub-portions are not limited to this connection method and may also be appropriately set to match any desired circuit configuration.

What is claimed is:

1. A dynamoelectric stator comprising:
   a cylindrical stator core in which a large number of slots are arranged at a predetermined pitch circumferentially so as to be open on an inner peripheral side; and
   a stator winding having a plurality of phase windings installed inside said slots, said plurality of phase windings forming first and second coil end groups at first and second axial end portions of said stator core,
   wherein:
   phase winding lead portions are each led out from said first coil end group so as to constitute a led out portion, subsequently led around circumferentially along an apex portion of said first coil end group so as to be separated from said apex portion, and joined to a respective joined phase winding lead portion to constitute said stator winding; and at least one of said phase winding lead portions constitutes a fastened lead portion fixed to an unjoined phase winding lead portion lying parallel circumferentially along said apex portion of said first coil end group by fastening using a fastening member.

2. The dynamoelectric stator according to claim 1, wherein:

a pair of said phase winding lead portions to be joined to each other are led around circumferentially along said apex portion of said first coil end group, then bent axially so as to contact each other closely and constitute a bent portion, and joined together; and said fastened lead portion is fixed to said unjoined phase winding lead portion by fastening using said fastening member in a vicinity of said bent portion.

3. The dynamoelectric stator according to claim 1, wherein:

said fastened lead portion is fixed to said unjoined phase winding lead portion by fastening using said fastening member in a vicinity of said led out portion.

* * * * *